United States Patent
Salinger

(10) Patent No.: US 8,588,198 B2
(45) Date of Patent: Nov. 19, 2013

(54) CONTENT TRANSMISSION ARCHITECTURE

(75) Inventor: Jorge Salinger, Littleton, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 371 days.

(21) Appl. No.: 12/910,932

(22) Filed: Oct. 25, 2010

(65) Prior Publication Data

US 2012/0099494 A1   Apr. 26, 2012

(51) Int. Cl.
*H04W 4/00*   (2009.01)
*H04B 7/00*   (2006.01)
*H04N 7/173*   (2011.01)

(52) U.S. Cl.
USPC ............ 370/341; 370/343; 370/486; 725/116

(58) Field of Classification Search
None
See application file for complete search history.

(56) References Cited

U.S. PATENT DOCUMENTS

| | | | |
|---|---|---|---|
| 2005/0169270 A1* | 8/2005 | Mutou et al. | 370/390 |
| 2007/0281722 A1* | 12/2007 | Gao | 455/518 |
| 2008/0008202 A1* | 1/2008 | Terrell et al. | 370/401 |
| 2009/0059924 A1* | 3/2009 | Muramoto et al. | 370/390 |
| 2010/0008280 A1* | 1/2010 | Ornbo et al. | 370/312 |
| 2011/0168779 A1* | 7/2011 | Wang et al. | 235/462.46 |
| 2012/0014311 A1* | 1/2012 | Ulupinar et al. | 370/312 |

* cited by examiner

*Primary Examiner* — Chi Pham
*Assistant Examiner* — Soon-Dong D Hyun
(74) *Attorney, Agent, or Firm* — Banner & Witcoff, Ltd.

(57) ABSTRACT

An apparatus, method, and system are provided for combining and processing broadcast and narrowcast content on a common platform. The broadcast and narrowcast content may be processed, routed, encrypted, and transmitted. In some embodiments, a modulator may be used modulate the broadcast content and the output from that modulator may be coupled to an input of one or more interface cards. The inputs of the one or more interface cards may also be coupled to outputs from a plurality of modulators that may be configured to modulate the narrowcast content. In this manner, a reduction in resources may be obtained.

20 Claims, 10 Drawing Sheets

| USER/DEVICE ID | SERVICE GROUP # | DOWNSTREAM PORT 428d # | DOWNSTREAM CARD 404d # | INTERFACE 418 # |
|---|---|---|---|---|
| Mary-Jones-1234 | 1 | 1 | 1 | 1 |
| Mary-Jones-5678 | 3 | 1 | 1 | 2 |
| Tom-Smith-1969 | 5 | 2 | 2 | 2 |

Controller 444

ROW#1
ROW#2
ROW#3

Figure 5

CONTENT TRANSMISSION ARCHITECTURE

BACKGROUND

The transmission and distribution of content over networks has evolved over the years. Users expect a service provider to be able to deliver content in various formats and at various times. In order to meet user demand, service providers may distribute content over networks using a variety of transmission techniques or models, such as broadcast and narrowcast transmissions. Broadly speaking, a broadcast model is one in which the content may be transmitted without an intended receiver or recipient having been selected, where a particular receiver or recipient determines whether to receive the content. In a narrowcast model, content is targeted to specific receiver(s) or recipient(s). A narrowcast model may include multicast and/or unicast distribution models. In a multicast model, content is targeted to a plurality of specific receivers or recipients. In a unicast model, content is targeted to a specific receiver or recipient.

Trends indicate that user consumption of narrowcast content is increasing relative to user consumption of broadcast content. This is influenced at least in part by a time-shifted consumption of content, such as video on demand (VOD), where users view and consume content at a time and place of their choosing.

While distribution of narrowcast content can be implemented with a single device, such as at a central location (e.g., a headend), broadcast content (in both analog and digital formats) is typically implemented via dedicated components and combined into a line-up for each narrowcast service group. This process may result in the use of a considerable amount of equipment. For example, additional components or circuits may be required, for which additional space, power, and cooling capacity may be required.

Additionally, each time content provided in a lineup is changed, complex operational processes may be needed to support the modification. This may be especially true when the change involves a conversion from broadcast to narrowcast delivery (or vice versa), or when wiring changes are required. A significant impact may also be imposed on a service provider in terms of operations, such as management of a combiner (e.g., an optical or radio frequency (RF) combiner).

Given the above-noted issues, and in conjunction with other issues that will become apparent upon reviewing this disclosure, content and service providers continue to seek improved techniques for distributing and transmitting content to users.

SUMMARY

This summary is not intended to identify critical or essential features of the disclosure provided herein, but instead merely summarizes certain features and variations thereof.

In some illustrative embodiments, components associated with two or more distribution or transmission techniques may be combined or integrated on a common platform. For example, in the context of quadrature amplitude modulation (QAM), a set of broadcast Quadrature Amplitude Modulators (QAMS) may be added to a Converged Multiservice Access Platform (CMAP), enabling the transmission and receipt of broadcast and narrowcast signals via one or more networks.

In some illustrative embodiments, a line card (LC) may be associated with or integrated in a CMAP. The LC may be configured to receive broadcast and/or narrowcast content.

In some illustrative embodiments, an LC may be configured to process the content to generate a content lineup, such as a program lineup. For example, the LC may be configured to generate one or more modulated outputs based on the received content. The LC may include one or more generators, such as a radio frequency (RF) generator, to process or generate RF signals.

Other details and features will also be described in the sections that follow.

BRIEF DESCRIPTION OF THE DRAWINGS

The present disclosure is pointed out with particularity in the appended claims. Features of the disclosure will become more apparent upon a review of this disclosure in its entirety, including the drawing figures provided herewith.

Some features herein are illustrated by way of example, and not by way of limitation, in the figures of the accompanying drawings and in which like reference numerals refer to similar elements.

FIG. 5 illustrates a mapping that may be used to route content in accordance with one or more aspects of this disclosure.

DETAILED DESCRIPTION

Various connections between elements are discussed in the following description. These connections are general and, unless specified otherwise, may be direct or indirect, wired or wireless, and this specification is not intended to be limiting in this respect.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
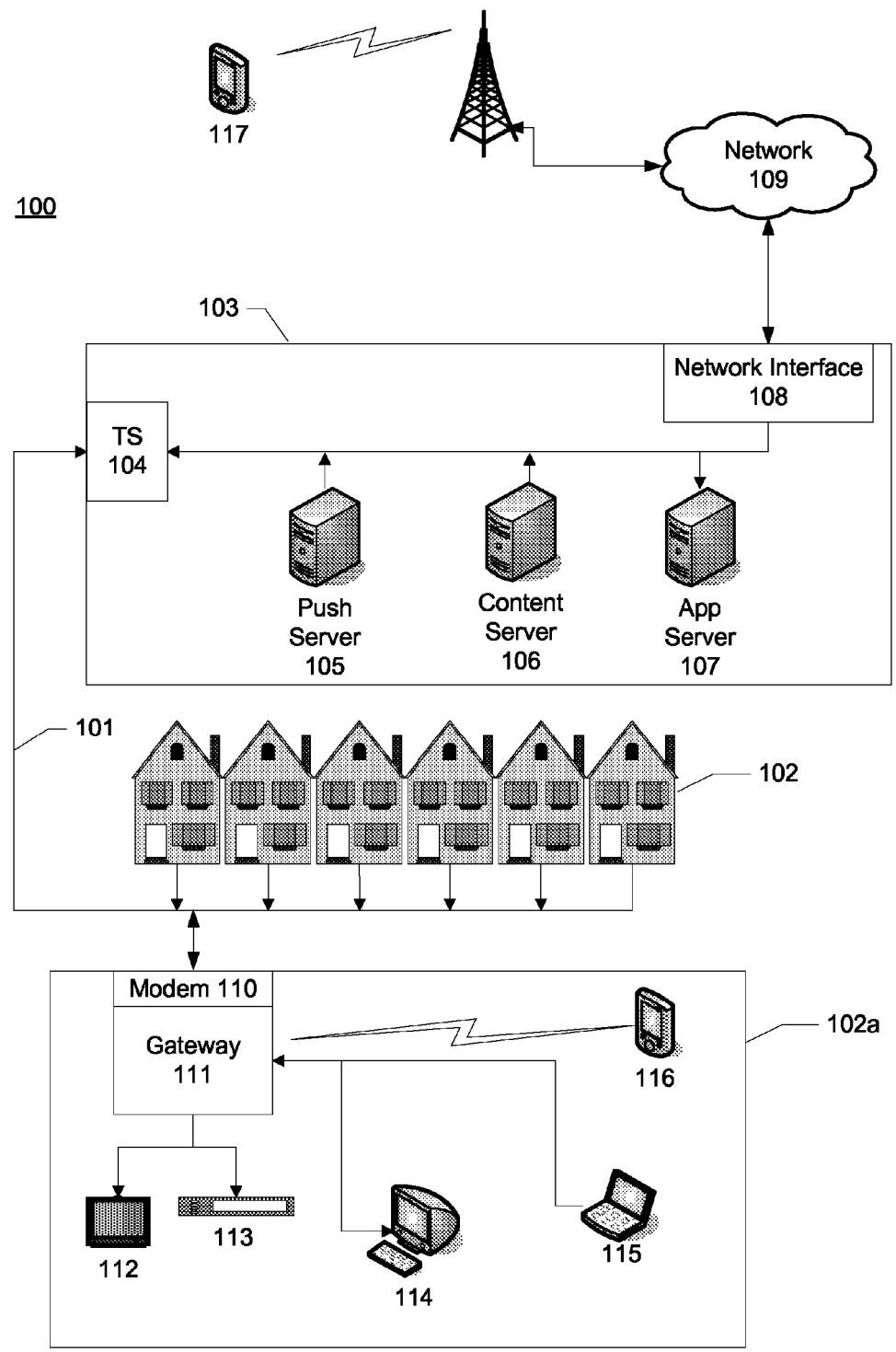
FIG. 1 illustrates an example information distribution network.

FIG. 1 illustrates an example information distribution network 100 on which many of the various features described herein may be implemented. Network 100 may be any type of information distribution network, such as satellite, telephone, cellular, wireless, etc. One example may be an optical fiber network, a coaxial cable network or a hybrid fiber/coax (HFC) distribution network. Such networks 100 use a series of interconnected communication lines 101 (e.g., coaxial cables, optical fibers, wireless links, etc.) to connect multiple premises 102 (e.g., businesses, homes, consumer dwellings, etc.) to a provider's central office (e.g., headend) 103. The central office 103 may transmit downstream information signals onto the lines 101, and each home 102 may have a receiver used to receive and process those signals.

There may be one line 101 originating from the central office 103, and it may be split a number of times to distribute the signal to various homes 102 in the vicinity (which may be many miles) of the central office 103. The lines 101 may include components not illustrated, such as splitters, filters, amplifiers, etc. to help convey the signal clearly, but in general each split introduces a bit of signal degradation. Portions of the lines 101 may also be implemented with fiber-optic cable, while other portions may be implemented with coaxial cable, other lines, or wireless communication paths. By running fiber optic cable along some portions, for example, signal degradation in those portions may be significantly minimized, allowing a single central office 103 to reach even farther with its network of lines 101 than before.

The central office 103 may include a termination system (TS) 104, such as, in an HFC-type network, a cable modem termination system (CMTS), which may be a computing device configured to manage communications between devices on the network of lines 101 and backend devices such as servers 105-107 (to be discussed further below). The termination system (TS) may be as specified in a standard. In an HFC-type network, for example, the standard may be the Data Over Cable Service Interface Specification (DOCSIS) standard, published by Cable Television Laboratories, Inc. (a.k.a. CableLabs), or it may be a similar or modified device instead. The termination system (TS) may be configured to place data on one or more downstream frequencies to be received by gateways and/or modems at the various homes 102, and to receive upstream communications from those gateways and/or modems on one or more upstream frequencies. The central office 103 may also include one or more network interfaces 108, which can permit the central office 103 to communicate with various other external networks 109. These networks 109 may include, for example, networks of Internet Protocol devices, telephone networks, cellular telephone networks, fiber optic networks, local wireless networks (e.g., WiMAX), satellite networks, and any other desired network. The interface 108 may include the corresponding circuitry needed to communicate on the network 109, and with other devices on the network such as a cellular telephone network and its corresponding cell phones.

As noted above, the central office 103 may include a variety of servers 105-107 that may be configured to perform various functions. For example, the central office 103 may include a push notification server 105. The push notification server 105 may generate push notifications to deliver data and/or commands to the various homes 102 in the network (or more specifically, to the devices in the homes 102 that are configured to detect such notifications). The central office 103 may also include a content server 106. The content server 106 may be one or more computing or storage devices that are configured to provide content to users in the homes. This content may be, for example, video on demand movies, television programs, songs, text listings, etc. The content server 106 may include software to validate user identities and entitlements, locate and retrieve requested content, encrypt the content, and initiate delivery (e.g., streaming) of the content to the requesting user and/or device.

The central office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide or interactive program guide listings. Another application server may be responsible for monitoring user viewing habits and collecting that information for use in selecting advertisements. Another application server may be responsible for formatting and inserting advertisements in a video stream being transmitted to the homes 102. Another application server may be responsible for receiving user remote control commands, and processing them to provide an intelligent remote control experience.

An example home 102*a* may include an interface such as a modem 110, which may include transmitters and receivers used to communicate on the lines 101 and with the central office 103. The modem 110 may be, for example, a coaxial cable modem (for coaxial cable lines 101), a fiber interface node (for fiber optic lines 101), or any other desired interface device. The modem 110 may be connected to, or be a part of, a gateway interface device 111. The gateway interface device 111 may be a computing device that communicates with the modem 110 to allow one or more other devices in the home to communicate with the central office 103 and other devices beyond the central office. The gateway 111 may be a set-top box (STB), digital video recorder (DVR), computer server, or any other desired computing device. The gateway 111 may also include (not shown) local network interfaces to provide communication signals to devices in the home, such as televisions 112, additional STBs 113, personal computers 114, laptop computers 115, wireless devices 116 (wireless laptops and netbooks, mobile phones, mobile televisions, personal digital assistants (PDA), etc.), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others. The gateway 111 may be connected directly to lines 101.

Figure 2:
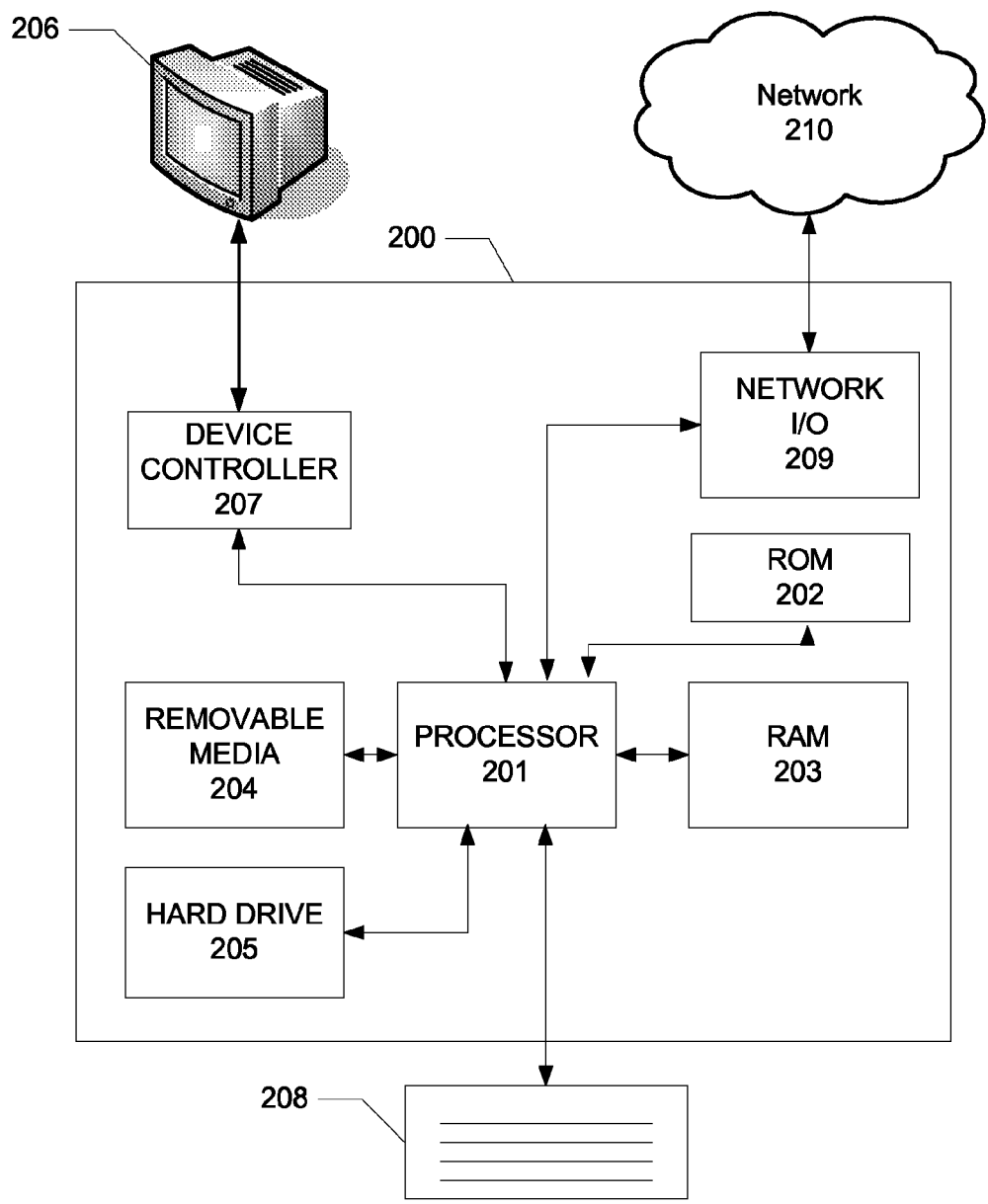
FIG. 2 illustrates an example hardware platform on which the various elements described herein can be implemented.

FIG. 2 illustrates general hardware elements that can be used to implement any of the various computing devices discussed above. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication lines 101 discussed above, the external network 109, an in-home network, a provider's wireless, coaxial, fiber, or hybrid fiber/coaxial distribution system (e.g., a DOCSIS network), or any other desired network.

Figure 3:
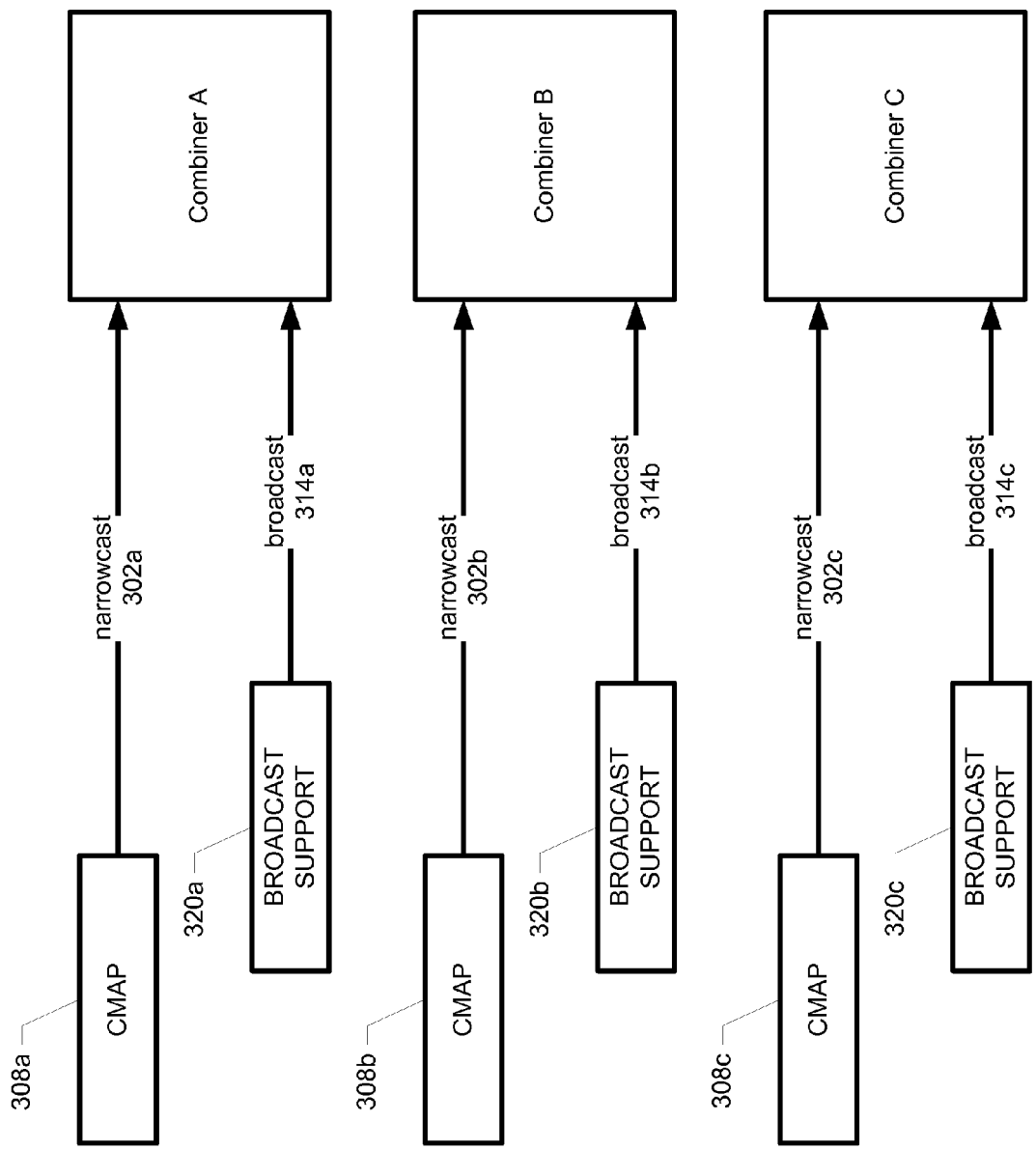
FIG. 3 illustrates an example architecture for combining broadcast content and narrowcast content in accordance with one or more aspects of this disclosure.

For example, as described in U.S. patent application Ser. No. 12/415,594, filed Mar. 31, 2009, and entitled "Subscriber Access Network Architecture," the contents of which are incorporated herein by reference, a Converged Multiservice Access Platform (CMAP) may provide support components and circuitry for narrowcast transmissions. In some embodiments, the CMAP may be located at a central location or office, such as central office 103 of FIG. 1. As shown in FIG. 3, narrowcast based outputs 302a, 302b, and 302c of the CMAPs 308a, 308b, and 308c, respectively, may be combined (by way of combiners A, B, and C) with outputs 314a, 314b, and 314c from broadcast support components and circuitry 320a, 320b, and 320c, respectively. Combiners A, B, and C may include one or more splitters in some embodiments.

In reference to the aforementioned U.S. patent application Ser. No. 12/415,594, and FIG. 2 therein in particular, elements 1020-PPN and 1021-AN may provide functionality similar to CMAPs 308a, 308b, and/or 308c described herein. Moreover, the "2-way combiner" shown in FIG. 2 of U.S. patent application Ser. No. 12/415,594 may provide a function similar to combiners A, B, and/or C described herein. The architectures shown in FIG. 2 of U.S. patent application Ser. No. 12/415,594 and FIG. 3 of this disclosure are illustrative. In some embodiments, one or more elements (e.g., elements 1020-PPN and 1021-AN of U.S. patent application No. 12/415,594) may be combined to form a CMAP (e.g., CMAP 308a as shown in FIG. 3 of this disclosure).

Thus, as shown in FIG. 3, for each narrowcast output 302, a corresponding broadcast support component and circuit 320 and combiner (A, B, or C) may be used. This may be the result even when broadcast support components and circuitry 320a, 320b, and 320c are transmitting a subset of common content. Moreover, while three CMAPs are shown in FIG. 3, in some embodiments more or less than three CMAPs may be used/present. In many embodiments more than three CMAPs may be included in order to meet high user demand and quality of service (QoS) operating parameters.

Figure 4:
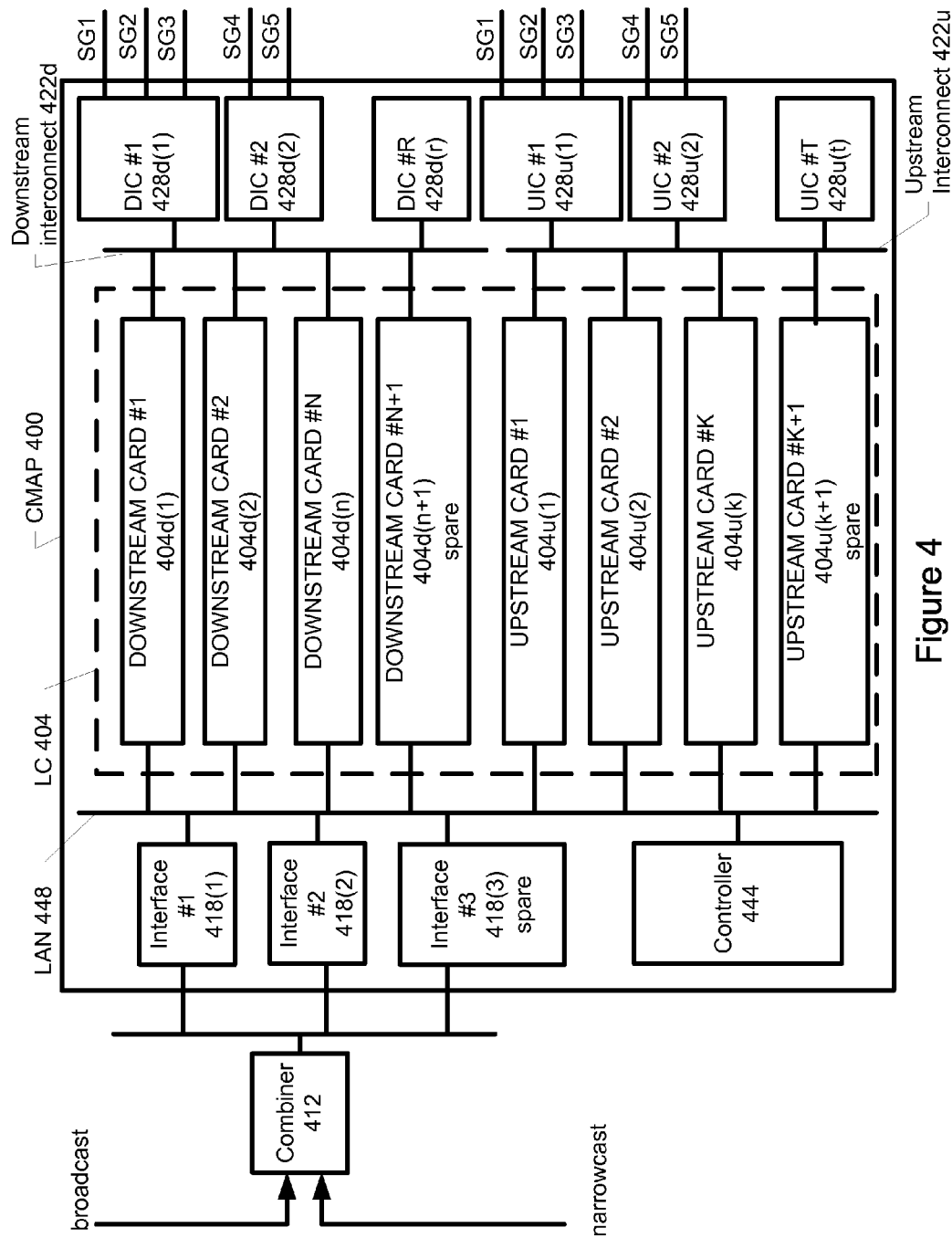
FIG. 4 illustrates an example architecture for distributing content using a line card in accordance with one or more aspects of this disclosure.

Improvements may be made to the architecture shown in FIG. 3 in order to reduce power dissipation, operational complexity, footprint size, and management involvement, amongst other factors and costs. As shown in FIG. 4, in some embodiments a line card (LC) (or another device having similar functionality) 404 may be integrated in a CMAP 400. The LC may reside on a single card or board or on multiple cards or boards. For example, as shown in FIG. 4, LC 404 may be segmented as a plurality of downstream cards 404d(1), 404d(2) . . . 404d(n), 404d(n+1) and a plurality of upstream cards 404u(1), 404u(2) . . . 404u(k), 404u(k+1), where n and k are integers (and where n and k may be equal or different in some embodiments). In some embodiments, a number of each of the downstream cards (404d) and a number of the upstream cards (404u) may be treated or used as spares. For example, downstream cards 404d(1) through 404d(n) may be active while downstream card 404d(n+1) may be used as a spare that may be switched into use when one of downstream cards 404d(1) through 404d(n) fails. Similarly, upstream cards 404u(1) through 404u(k) may be active while upstream card 404u(k+1) may be used as a spare that may be switched into use when one of upstream cards 404u(1) through 404u(k) fails.

LC 404 may be configured to receive content in accordance with one or more distribution types or models, such as broadcast content and narrowcast content. As shown in FIG. 4, the one or more types of content distributions (e.g., different transport streams) may be combined via one or more combiners 412 and transmitted to the LC through one or more interfaces 418 (three of which are shown in FIG. 4).

In some embodiments combiner 412 may include a switch and/or a router configured to combine broadcast and narrowcast content for use in a given domain, such as an Ethernet domain.

In some embodiments, interfaces 418 may include 100 gigabit Ethernet interfaces (IFs). In some embodiments, one or more of interfaces 418 may be treated or used as a spare. For example, interfaces 418(1) and 418(2) may be actively used, and interface 418(3) may be treated as a spare to be used in the event that one of interfaces 418(1) and 418(2) fails.

Interfaces 418 may be used to provide capacity and redundancy in some embodiments. In some embodiments, interfaces 418 may route packets, via a local area network (LAN) 448, to one or more line cards (LCs) 404. The routing conducted by interfaces 418 may be based on commands or directives issued by a controller 444. In some embodiments, interface 418(1) may route a subset of broadcast content while interface 418(2) may route another subset, or the remainder of, the broadcast content. Similarly, in some embodiments, interface 418(1) may route a subset of narrowcast content while interface 418(2) may route another subset, or the remainder of, the narrowcast content.

In some embodiments, LCs 404 (and more specifically, downstream cards 404d) may process content (e.g., packets) to generate a representation of the content at radio frequency (RF).

As shown in FIG. 4, the output(s) of downstream cards 404d may be directed to one or more downstream interconnects 422d. Downstream interconnect(s) 422d may include one or more relays or relay-like devices to facilitate dynamically connecting a downstream card 404d to one or more downstream interface cards (DICs) 428d(1), 428d(2) . . . 428d(r), where r is an integer.

The DICs 428d may provide content at one or more frequencies, such as a radio frequency (RF), to one or more service groups (SGs). Each SGs may represent a collection of one or more users, user devices, and/or network components that are serviced by or receive content from the CMAP 400. In some embodiments, the DICs 428d may be passive or near passive modules to provide a physical interface between a line card and a connection to one or more networks in order to provide service to one or more SGs. In some embodiments, the DICs 428d may include one or more devices, such as splitters, combiners, cabling, communication links, and/or other interfaces to an internal backplane (such as downstream interconnects 422d) and external connectors (not shown).

In some embodiments, the number 'r' of downstream interface cards 428d may be equal to the number 'n' of active downstream cards 404d, and there may exist a one-to-one correspondence between a downstream card 404d (e.g., 404d(1)) and a downstream interface card 428d (e.g., 428d(1)), while the additional downstream card 404d(n+1) may be treated or used as a spare in the event of a failure of one of downstream cards 404d(1) through 404d(n).

In some embodiments, the choice of how to route content via interfaces 418, downstream cards 404d, and/or downstream interface cards 428d may be based on a user identifier or a user device identifier. For example, controller 444 may maintain or store in memory a mapping of user identifiers and/or user device identifiers to select one or more interface 418, downstream card 404d, and/or downstream interface card 428d for routing content. An example of such a mapping is shown in FIG. 5.

As shown in FIG. 5, a first user named Mary Jones may have two devices that are supported by the architecture of FIG. 4. A first device (1234) associated with Mary Jones may, for example, correspond to a set top box and a second device (5678) associated with Mary Jones may correspond to a smart phone. Mary's first device may be located in a geographical or logical region serviced by service group #1 (SG1) of FIG. 4, whereas Mary's second device may be located in a geographical or logical region serviced by service group #3 (SG3). For example, Mary's home (e.g., home 102 of FIG. 1) may be located in a neighborhood that corresponds to service group SG1, whereas Mary may currently be out to lunch with her friend in an area covered by service group SG3. Thus, Mary's first device (e.g., the set top box or a display device located in her home) may correspond to SG1 while her second device (e.g., her smart phone or another mobile device that is in her possession while out to lunch) may correspond to SG3 as indicated in rows #1 and #2 in FIG. 5.

As shown in FIGS. 4 and 5, SG1 may be serviced via downstream interface card 428d(1), downstream card 404d(1), and interface 418(1). This service information with respect to Mary's first device (1234) is reflected in the mapping shown in FIG. 5 in row #1. SG3 may be serviced via downstream interface card 428d(1), downstream card 404d(1), and interface 418(2). This service information with respect to Mary's second device (5678) is reflected in the mapping shown in FIG. 5 in row #2.

Another user, named Tom Smith, may have one device (with an ID corresponding to 1969) that is supported by the architecture of FIG. 4. For example, Tom Smith's device may correspond to a gateway or a modem. Tom's device may receive service via service group #5 (SG5) of FIG. 4. As shown in FIG. 4, SG5 may be serviced via downstream interface card 428d(2), downstream card 404d(2), and interface 418(2). This service information with respect to Tom's device (1969) is reflected in the mapping shown in FIG. 5 in row #3.

The mapping shown in FIG. 5 is illustrative. In some embodiments, additional information may be included. For example, in some embodiments mapping information may be maintained corresponding to the downstream cards 404d, downstream interface cards 428d, upstream cards 404u, and upstream interface cards (UICs) 428u shown in FIG. 4. In some embodiments, the mapping information may include packet or transport stream identifiers to facilitate selection or routing of content. UICs 428u may be used to receive and route incoming upstream communications as described in further detail below. Moreover, while the user/device IDs are shown in the form of a mnemonic-and-number in FIG. 5, any other type and format of IDs may be used. For example, in some embodiments an address (such as a MAC address) may be used. In some embodiments, an end-device address (e.g., a MAC address, an IP address, etc.) may be used to determine where a device is located. For example, using IP addresses, unicast content may be transmitted to a specific device when its individual IP address is used (such as 24.48.1.101), or to multiple devices when a range of IP addresses is used (such as all devices in the range 24.48.0.0) or to all devices (such as 0.0.0.0). The CMAP may keep track of the IP addresses in each service group (SG), and transmit one more packets to one or more service groups (SGs) and devices within a service group (SG) depending on the contents of a mapping table (such as the one used in connection with FIG. 5). Moreover, while the mapping information shown in FIG. 5 may be stored, maintained, or accessible by controller 444, the mapping information may be stored or maintained at one or more devices or components (e.g., line card(s) 404) in some embodiments.

The mapping information in FIG. 5 may be dynamically updated. For example, the mapping information may be modified in response to device/component failures, loading conditions, and other network related issues. For example, controller 444 may update the information included in the mapping of FIG. 5 in order to switch in a spare interface or card (e.g., 418(3), 404d(n+1) and/or 404u(k+1)) in response to a failure of an active card.

In some embodiments, broadcast content may be routed to all of the downstream cards 404d and downstream interface cards 428d for transmission to multiple (or even all) service groups (SGs) via a common (shared) set of modulators. For example, briefly referring back to FIG. 3, broadcast support components 320a-320c may physically be the same component or device (e.g., one for all of combiners A, B, and C).

In some embodiments, narrowcast content may be routed to particular downstream card(s) 404d and particular downstream interface card(s) 428d, if a user or device is included in a service group (SG) or service groups (SGs) supported by that/those particular downstream interface card(s) 428d (and corresponding downstream card(s) 404d). The narrowcast content may be transmitted to a particular service group (SG) or service groups (SGs) via individual (dedicated) sets of modulators. For example, briefly referring back to FIG. 3, CMAP components 308a-308c may be different components or devices.

Figure 6:
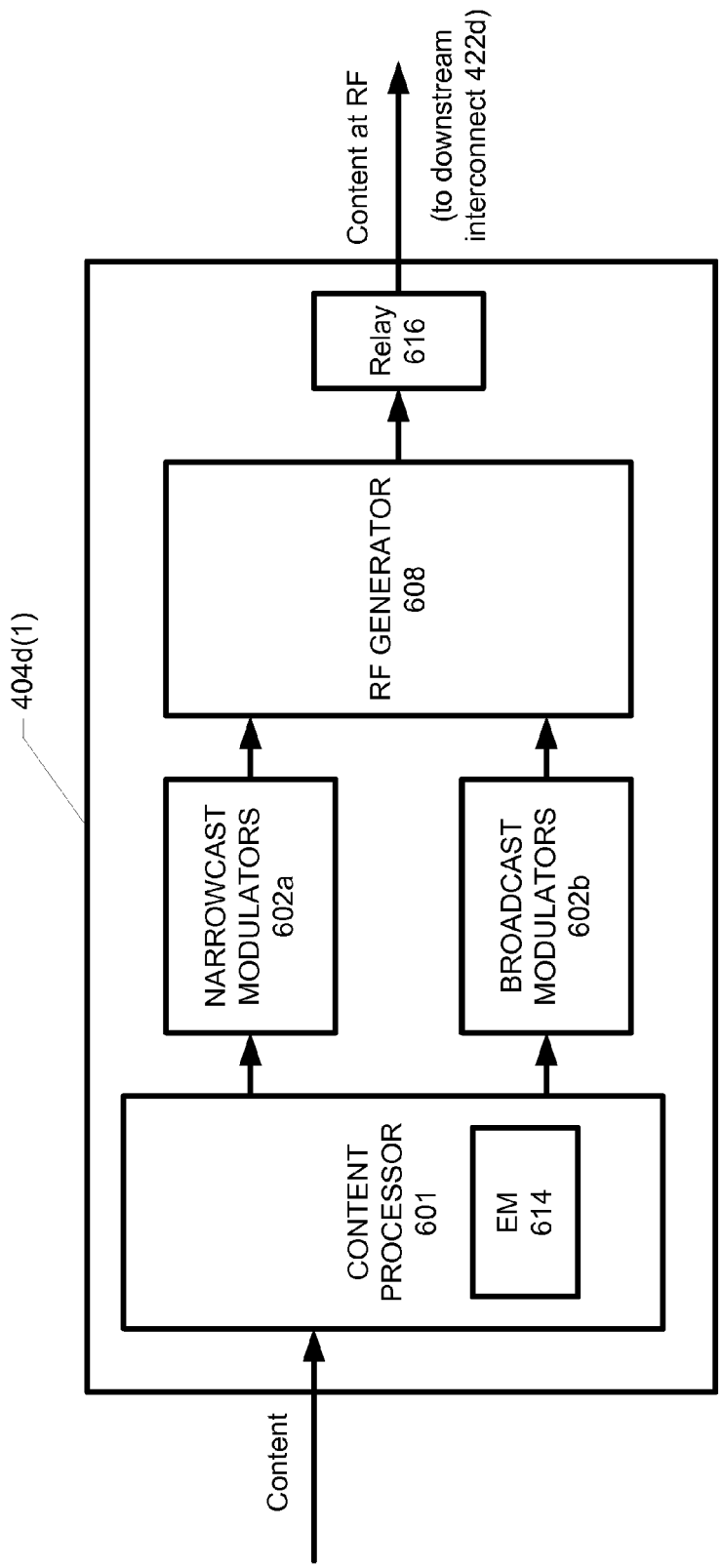
FIGS. 6-8 illustrate line cards that may be used to distribute content in accordance with one or more aspects of this disclosure.

As described above, LC 404 may be configured to process incoming broadcast and narrowcast content. For example, the architecture shown in FIG. 6 may be used to achieve a provisioning of broadcast content and narrowcast content in an RF domain. As shown in FIG. 6, downstream card 404d(1) may include one or more content processors 601, narrowcast modulators 602a, broadcast modulators 602b, and an RF generator 608. Content processor 601 may receive incoming content (for example, from one or more interfaces 418 via LAN 448), distinguish between the different types of content (e.g., broadcast content and narrowcast content), and route the content to a modulator based on the content type.

Content processor 601 may include one or more encryption modules (EM) 614 to encrypt the incoming content (e.g., to encrypt the incoming narrowcast content). EMs 614 may receive commands or directives from controller 444, where the commands/directives provide what keys to use, what content to encrypt, and any other information to facilitate encryption.

Narrowcast modulators 602a may modulate the incoming narrowcast content (which may be contained in IP data packets in some embodiments). In some embodiments quadrature amplitude modulation (QAM) may be used in connection with narrowcast modulators 602a. In some embodiments sixty-four (64) modulators may be used in connection with narrowcast modulators 602a. In a similar manner, broadcast modulators 602b may modulate the incoming broadcast content (which may be contained in IP data packets in some embodiments). In some embodiments quadrature amplitude modulation (QAM) may be used in connection with broadcast modulators 602b. In some embodiments ninety-six (96) modulators may be used in connection with broadcast modulators 602b. Other forms of modulation (e.g., amplitude modulation, frequency modulation, etc.) may be used as an alternative to, or in addition to, QAM in some embodiments. Additionally, a different quantity of modulators may be used in some embodiments.

As shown in FIG. 6, RF generator 608 may receive narrowcast modulated content from narrowcast modulators 602a and broadcast modulated content from broadcast modulators 602b. RF generator 608 may process the signals received at its input to generate content suitable for transmission and distribution at RF (via downstream interconnect 422d of FIG. 4, for example).

As shown in FIG. 6, downstream card 404d(1) may include a relay 616. Relay 616 may be configured to dynamically connect and disconnect the output of RF generator 608 to downstream interconnect 422d. Controller 444 of FIG. 4 may be configured to command or control whether relay 616 is 'on' or 'off' (or enabled or disabled). In some embodiments, the function performed by relay 616 may be achieved using one or more other devices. For example, a switch may be used in addition to, or as an alternative to, the use of a relay.

Figure 7:
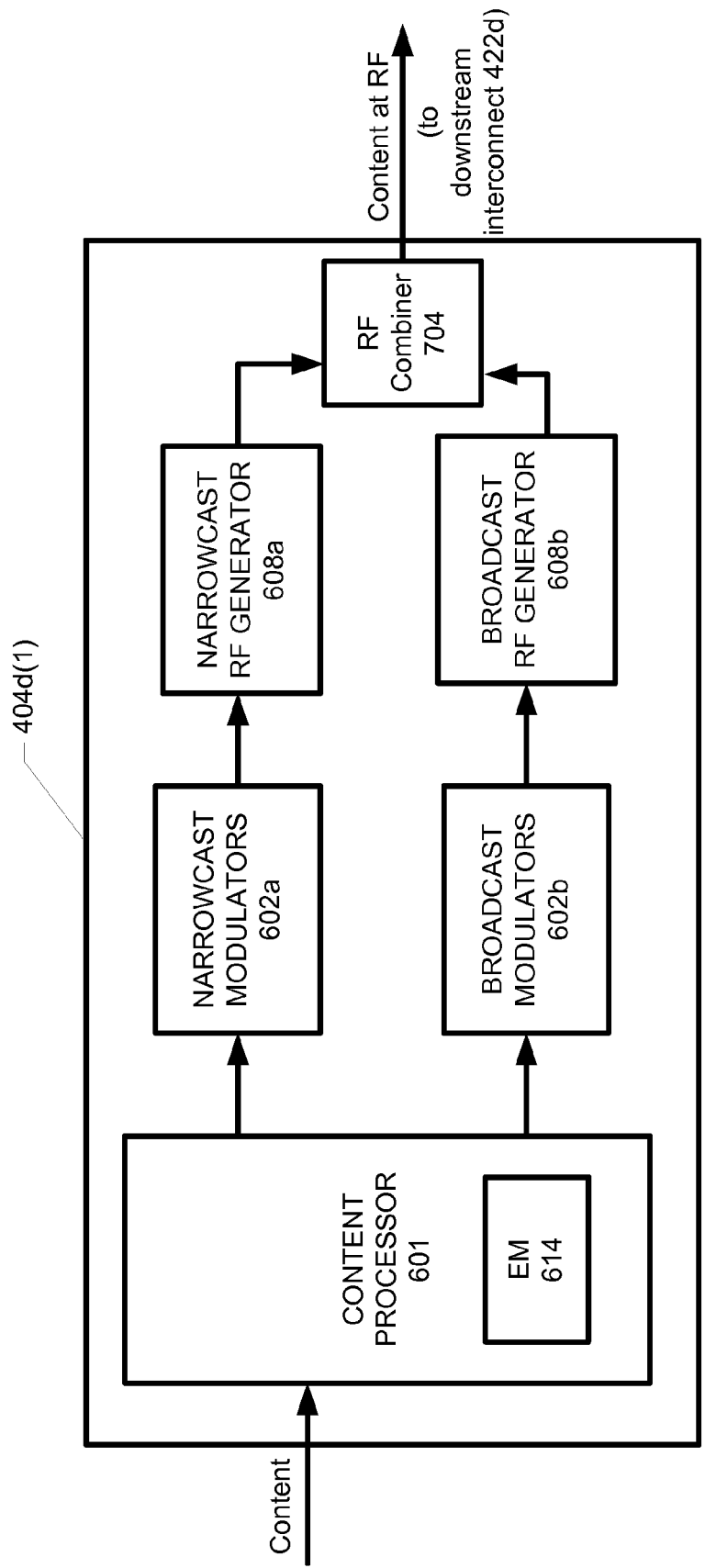

A variation architecture is shown in FIG. 7. In FIG. 7, the RF generator 608 has been split into separate RF generators to support narrowcast (608a) and broadcast (608b). Generally speaking, the fabrication of a line card 404d may be more difficult when using a single RF generator 608 as shown in FIG. 6 relative to the use of separate RF generators 608a and 608b as shown in FIG. 7. The use of separate RF generators 608a and 608b as shown in FIG. 7 may result in an easier production of line card 404d relative to the line card 404d of FIG. 6. However, the use of separate RF generators 608a and 608b may require the use of an RF combiner 704, which may result in degraded output signal quality and increased power consumption. Thus, an implementation decision may be made in terms of fabrication difficulty, signal quality, and power consumption when implementing the architectures described herein.

Figure 8:
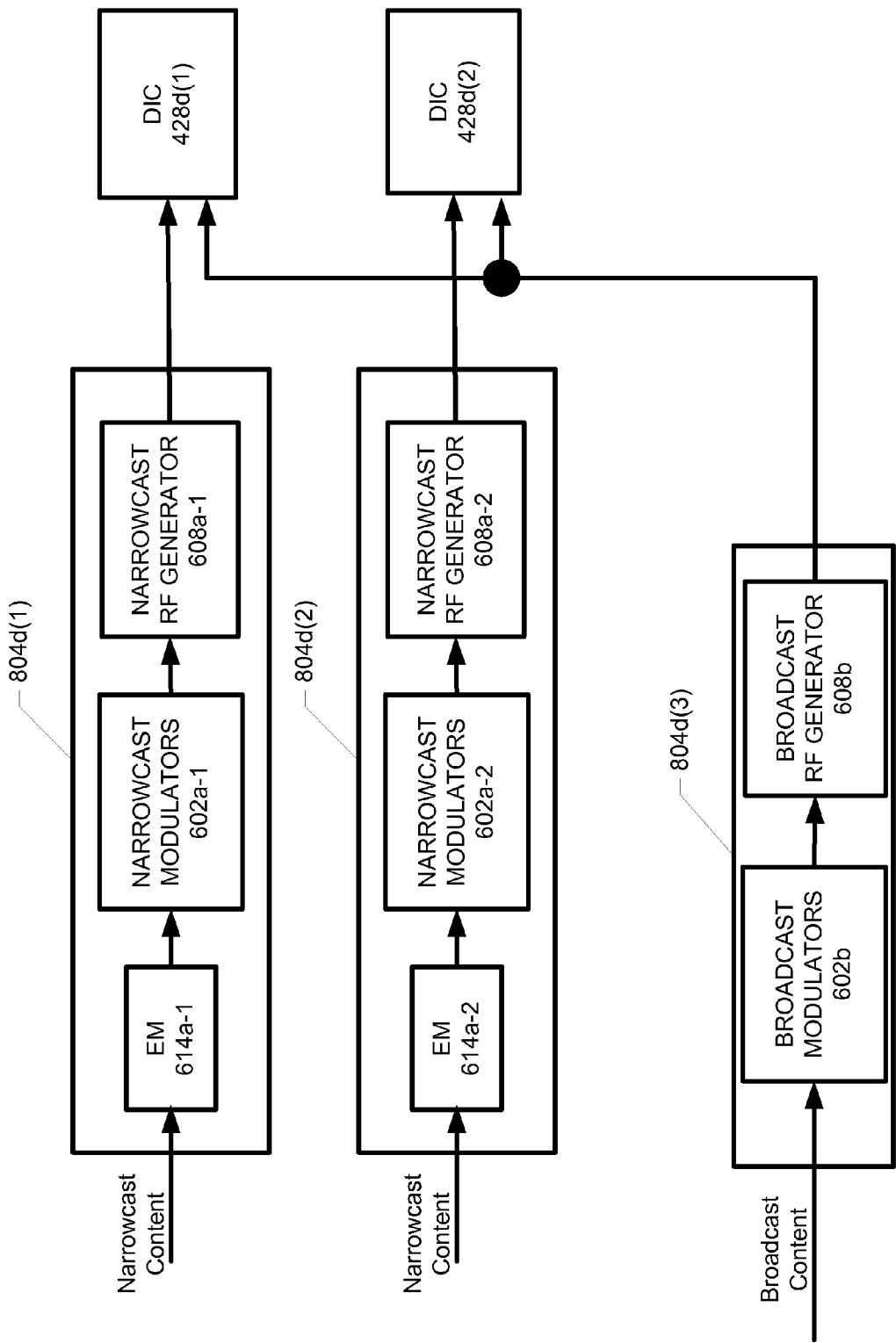

FIG. 8 represents another variation. FIG. 8 depicts three downstream cards, 804d(1) through 804d(3). As shown in FIG. 8, cards 804d(1) and 804d(2) may be used to generate narrowcast content in an RF domain based on input narrowcast content (via encryption modules (EMs) 614a-1 and 614a-2, narrowcast modulators 602a-1 and 602a-2, and narrowcast RF generators 608a-1 and 608a-2). Card 804d(3) may be used to generate broadcast content in an RF domain based on input broadcast content (via broadcast modulators 602b and broadcast RF generator 608b). The outputs of cards 804d(1) and 804d(2) may be transmitted to downstream interface cards (DICs) 428d(1) and 428d(2), respectively. The output of card 804d(3) may be transmitted to both of DICs 428d(1) and 428d(2). Thus, where conventional systems may have required 'y' broadcast modulators 602b to support 'y' narrowcast modulators 602a, the architecture of FIG. 8 reflects that in some embodiments the number of broadcast modulators 602b for each narrowcast modulator 602a may be reduced by a factor of 1/y, where y is an integer. FIG. 8 shows a sharing of broadcast modulators 602b across two (sets of) narrowcast modulators, 602a-1 and 602a-2. The reduction factor (1/y) may be further improved as the broadcast modulators 602b are shared with more than two (sets of) narrowcast modulators 602a.

Circuitry and components similar to the downstream path may be present in a CMAP to support upstream communications, such as from customer premises equipment (e.g., set top boxes, modems, etc.). For example, as shown in FIG. 4 and as described above, CMAP 400 may include one or more upstream interface cards (UICs) 428u(1), 428u(2) . . . 428u(t), where t is an integer. In some embodiments, the number 't' of upstream interface cards 428u may be equal to the number 'k' of active upstream cards 404u, and there may in general exist a one-to-one correspondence between an upstream card 404u (e.g., 404u(1)) and an upstream interface card 428u (e.g., 428u(1)), and the additional upstream card 404u(k+1) may be treated or used as a spare in the event of a failure of one of upstream cards 404u(1) through 404u(k).

Communications received at upstream interface cards 428u may be forwarded to controller 444 via one or more upstream interconnects 422u, upstream cards 404u, and LAN 448. Controller 444 may process the received upstream communications, which may include command, control, and/or selection information received from one or more network components and/or client-side devices. In response to the processing performed on the upstream communications, controller 444 may issue one or more commands to control the distribution and transmission of content over a network (e.g., network 100 of FIG. 1). In some embodiments, the upstream communication received at one or more of UIC(s) 428u, upstream card(s) 404u, and/or controller 444 may be sent further upstream for additional handling or processing.

While not shown in FIG. 4, in some embodiments one or more probes may be included in an LC 404 (or in another device included in a network, such as network 100 of FIG. 1). The probes may be configured to monitor network communications, traffic, and the like. The probes may transmit information or data indicative of the state of the network in connection with the upstream transmissions received at LC 404.

In some embodiments, functions performed by LC 404 (or any other device, optionally associated with a CMAP) may be classified as packet shelf (PS) functions and access shelf (AS) functions. The PS functions may include user management, service flow management, content stream manipulation (e.g., content stream creation, content clock reference stamping, etc.), layer protocol manipulation and other such functions. The AS functions may include upstream and downstream functions (for example, in relation to a physical layer and of a type normally associated with a termination system (TS) and an edge QAM, and portions of a media access control (MAC) layer to support upstream and downstream flows), and may include portions associated with physical layer and MAC layer functionality.

The techniques for distributing and transmitting signals described herein may take place in accordance with one or more communication protocols. For example, television communication protocols, satellite communication protocols, cellular and telephone communication protocols, and the like may be used in some embodiments.

The architectures described herein are merely illustrative. In some embodiments, more or fewer components than those shown may be included, and in some embodiments additional components not shown may be included. In some embodiments, some or all of the components may be integrated with one another in a common casing or housing (e.g., on a single chip or die). In some embodiments, some components may be designated as spares to support functionality in the event of primary component issues or failures. In some embodiments some of the components may perform the same or similar functions but may be designed differently (e.g., may include different hardware, software, and/or firmware components) in order to enhance reliability and to mitigate against design, manufacturing, or fabrication bugs or defects.

Figure 9:
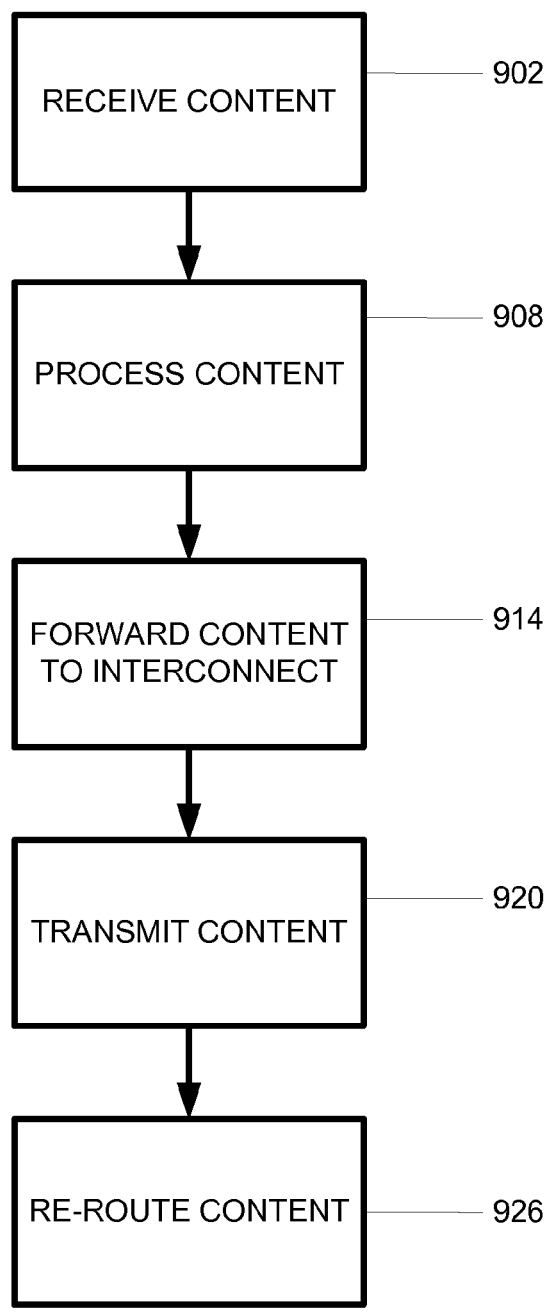
FIG. 9 illustrates a method for distributing content in a downstream direction in accordance with one or more aspects of this disclosure.

FIG. 9 illustrates a method that may be used in accordance with one or more aspects of this disclosure. The method of FIG. 9 may be implemented on one or more devices, including the components shown in the various architectures described herein. For purposes of illustration, the steps of FIG. 9 will be described in connection with the architecture of FIG. 4. Devices different from those cited in connection with FIG. 4 may be used in some embodiments to execute the method of FIG. 9.

In step 902, one or more types of content may be received. For example, one or more combiners 412 may receive transport streams including broadcast content and narrowcast (e.g., multicast and/or unicast) content, and may route the content to one or more line cards (LCs) 404 by way of one or more interfaces 418 and LAN 448.

In step 908, the received content may be processed at, e.g., one or more LCs 404. As part of the processing, the content may be subjected to encryption, modulation, up conversion, activity detection (e.g., determining that a client-side device is active, requesting data, or the like), compression, and the like. More generally, the processing associated with step 908 may prepare content for distribution or transmission to one or more network components or client-side devices.

In step 914, the processed content may be routed to one or more interconnects, such as downstream interconnect 422d. The interconnects may forward the content to one or more interface cards, such as downstream interface cards (DICs) 428d, for transmission over a network. As described previously, the forwarding of the content to the one or more interface cards may be controlled by controller 444, for example. Controller 444 may determine which interface card to route the content to based on a variety of factors or criteria, such as load balancing, maintaining quality of service (QoS) parameters, device health/failures, and the like.

In step 920, the content may be transmitted by one or more of the interface cards (e.g., downstream interface cards (DICs) 428d). The transmission associated with step 920 may include transmitting content to one or more service groups (SGs).

In step 926, content may be re-routed using one or more spare devices or components in the event of a failure. For example, in embodiments where interface 418(3) or downstream card 404d(n+1) are spares, one or more of those components may be switched into use in the event of a failure of interfaces 418(1) and 418(2) or downstream cards 404d(1) through 404d(n), respectively. Re-routing may also take place in response to additional criteria having been satisfied, such as a load on a particular component exceeding a threshold value.

The method depicted in FIG. 9 is merely illustrative. In some embodiments, the order of the steps may be changed, some steps may be optional, and steps not shown may be added. Moreover, in some embodiments multiple instances of the method may be executing at a given point in time. For example, a pipelined architecture may be used such that while a first set of content received at a first point in time is subject to the forwarding of step 914 while a second set of content received at a second, later point in time is subject to the processing of step 908. Such an architecture may minimize the number of resources used by promoting resource reuse while at the same time maximizing throughput. The various stages may be synchronized to one another (e.g., via a system clock) to ensure smooth transitions through the various stages of the pipeline.

Figure 10:
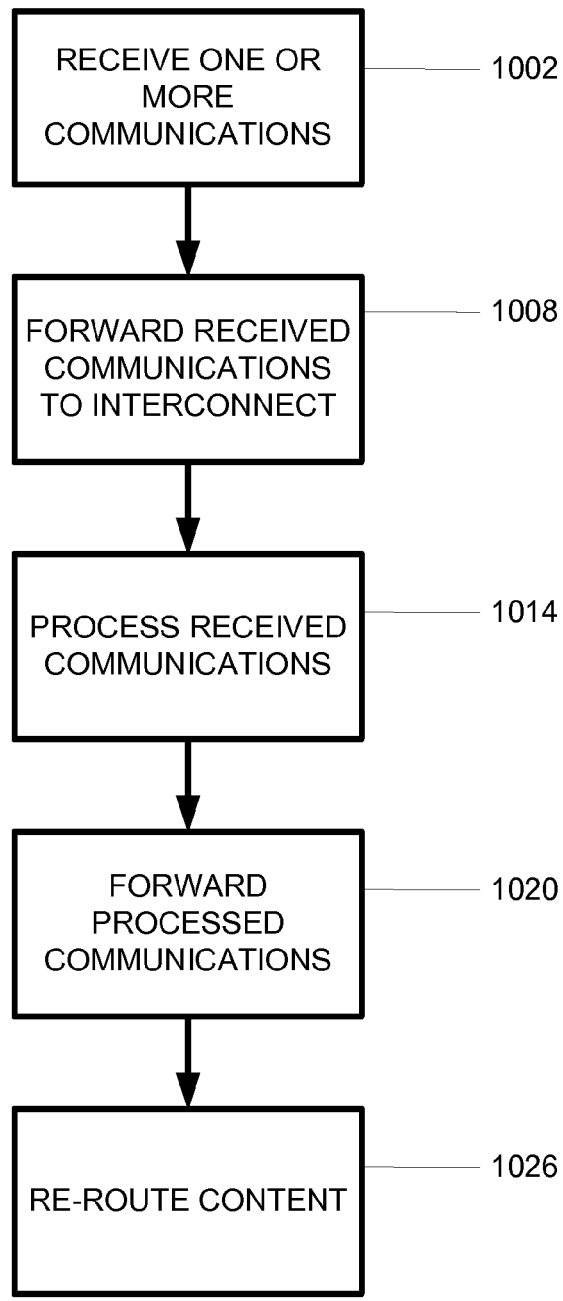
FIG. 10 illustrates a method suitable for receiving and processing an upstream communication in accordance with one or more aspects of this disclosure.

The method of FIG. 9 was largely described in connection with downstream transmissions. A similar method may be used to facilitate communications over an upstream path. For example, referring to FIGS. 4 and 10, in step 1002 one or more communications may be received at one or more interface cards, such as upstream interface cards (UICs) 428u. The communications may be received from one or more client-side devices (e.g., modem 110 of FIG. 1) and/or one or more network components (e.g., a router).

In step 1008, the received communications may be forwarded to one or more interconnects, such as upstream interconnects 422u, and the interconnects may forward the communications to one or more line cards, such as LCs 404 (or more specifically, upstream cards 404u).

In step 1014, the communications may be processed by one or more LCs 404. The processing may include demodulation, down conversion, decompression, and the like.

In step 1020, the processed communications may be forwarded to a controller, such as controller 444, that may extract data fields associated with the communications. The controller may make a decision based on an analysis of the extracted data fields. For example, the controller may command one or more interfaces 418, LCs 404 or interconnects (e.g., downstream interconnects 422d) that content to be transmitted via one or more downstream interface cards (e.g., downstream interface cards 428d) be redistributed in order to effectuate a more balanced system load. In general, the processing, routing, and transmission of content may be controlled based on the received communications. Other actions are possible dependent on the nature of the communications.

In step 1026, a received upstream communication may be re-routed using one or more spare devices or components in the event of a failure. For example, in embodiments where interface 418(3) or upstream card 404u(k+1) are spares, one or more of those components may be switched into use in the event of a failure of interfaces 418(1) and 418(2) or upstream cards 404u(1) through 404u(k), respectively. Re-routing may also take place in response to additional criteria having been satisfied, such as a load on a particular component exceeding a threshold value.

Although not required, various aspects described herein may be embodied as a method, a data processing system, or as a computer-readable medium storing executable instructions. Accordingly, those aspects may take the form of an entirely hardware embodiment, an entirely software embodiment, an entirely firmware embodiment, or an embodiment combining software, firmware and hardware aspects. The functionality may be resident in a single computing device, or may be distributed across multiple computing devices/platforms, the multiple computing devices/platforms optionally being connected to one another via one or more networks. For example, referring to FIG. 4, interfaces 418 and controller 444 may be organized or arranged on a common platform (which may be referred to as a management card) in some embodiments. Interfaces 418 and controller 444 may be replicated in some embodiments in order to provide redundancy.

Various signals representing content, data, or events as described herein may be transferred between a source and a destination in the form of electromagnetic waves traveling through signal-conducting media such as metal wires, optical fibers, and/or wireless transmission media (e.g., air and/or space).

The various methods and acts may be operative across one or more computing servers and one or more networks. The functionality may be distributed in any manner, or may be located in a single computing device (e.g., a server, a client computer, etc.). As discussed herein, content may be distributed to intermediary/network components and client-side devices at various times and in various formats. The distribution and transmission techniques described herein may leverage existing components and infrastructure to minimize power dissipation, operational complexity, footprint size, and management involvement, amongst other factors and costs.

The methodological acts and processes may be tied to particular machines or apparatuses. For example, as described herein, a Converged Multiservice Access Platform (CMAP) may be used in various embodiments of this disclosure in combination with a line card (LC) to receive and process content. The content may be formatted in accordance with one or more transmission techniques, types, or protocols, such as broadcast and narrowcast. More generally, one or more computers may include one or more processors and memory storing instructions, that when executed, perform the methodological acts and processes described herein. Furthermore, the methodological acts and processes described herein may perform a variety of functions including transforming an article (e.g., broadcast and narrowcast content) into a different state or thing (e.g., a concatenated or combined modulated output suitable for transmission over one or more networks).

Aspects of the disclosure have been described in terms of illustrative embodiments thereof. While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the features of the aforementioned illustrative examples may be utilized alone or in combination or subcombination with elements of the other examples. For example, any of the above described systems and methods or parts thereof may be combined with the other methods and systems or parts thereof described above. It will also be appreciated and understood that modifications may be made without departing from the true spirit and scope of the present disclosure. The description is thus to be regarded as illustrative instead of restrictive on the present disclosure.

What is claimed is:

1. A method comprising:
   receiving, at a device, broadcast content and narrowcast content;
   modulating, by at least one modulator at the device, the broadcast content and modulating, by a plurality of modulators at the device, the narrowcast content to produce modulated broadcast content and narrowcast content, wherein the plurality of modulators are separate from the at least one modulator;
   routing the modulated broadcast content and narrowcast content to at least one interface included in the device; and
   transmitting the modulated broadcast content and narrowcast content from the at least one interface.

2. The method of claim 1, wherein routing the modulated broadcast content and narrowcast content comprises routing the modulated broadcast content and narrowcast content via a radio frequency (RF) interconnect.

3. The method of claim 1, wherein the receiving of the narrowcast content comprises receiving multicast content or unicast content.

4. The method of claim 1, further comprising:
   receiving, at the device, a communication from at least one of a network component and a client-side device; and
   controlling at least one of the modulating, routing, and transmitting of the broadcast content and the narrowcast content based on the communication.

5. The method of claim 1, wherein modulating the broadcast content comprises modulating the broadcast content for a plurality of service groups using the at least one modulator and wherein modulating the narrowcast content comprises modulating the narrowcast content using the plurality of modulators, wherein each of the plurality of modulators is associated with a corresponding one of the plurality of service groups.

6. The method of claim 1, wherein the broadcast content and the narrowcast content are combined when received at the device.

7. The method of claim 1, wherein modulating the broadcast content and the narrowcast content comprises modulating the broadcast content and the narrowcast content based on quadrature amplitude modulation.

8. The method of claim 1, wherein the at least one interface comprises at least one interface card, and wherein the method further comprises:
   switching in at least one of a spare downstream card and a spare upstream card.

9. An apparatus comprising:
   at least one interface device;
   at least one processor; and
   memory storing instructions that, when executed by the at least one processor, cause the apparatus to:
      receive broadcast content and narrowcast content,
      modulate, by at least one modulator, the broadcast content and modulate, by a plurality of modulators, the narrowcast content to produce modulated broadcast content and narrowcast content, wherein the plurality of modulators are separate from the at least one modulator,
      route the modulated broadcast content and narrowcast content to the at least one interface device, and
      transmit the processed modulated broadcast and narrowcast content from the at least one interface device.

10. The apparatus of claim 9, wherein the instructions, when executed by the at least one processor, cause the apparatus to:
    route the modulated broadcast content and narrowcast content via a radio frequency (RF) switch.

11. The apparatus of claim 9, wherein the narrowcast content comprises multicast content or unicast content.

12. The apparatus of claim 9, wherein the instructions, when executed by the at least one processor, cause the apparatus to:
    receive a communication from at least one of a network component and a client-side device; and
    control at least one of the modulating, routing, and transmitting of the broadcast content and the narrowcast content based on the communication.

13. The apparatus of claim 9, wherein modulating the broadcast content comprises modulating the broadcast content for a plurality of service groups using the at least one modulator and wherein modulating the narrowcast content comprises modulating the narrowcast content using the plurality of modulators, wherein each of the plurality of modulators is associated with a corresponding one of the plurality of service groups.

14. The apparatus of claim 9, wherein the at least one interface device comprises at least one interface card, the apparatus further comprising:
    at least one downstream card,
    wherein the at least one downstream card comprises the at least one modulator and the plurality of modulators.

15. The apparatus of claim 14, wherein the at least one downstream card comprises at least one radio frequency (RF) generator coupled to the at least one modulator and the plurality of modulators.

16. The apparatus of claim 14, wherein the at least one downstream card comprises a plurality of radio frequency (RF) generators, wherein a first of the plurality of RF generators is coupled to the at least one modulator, and wherein a second of the plurality of RF generators is coupled to the plurality of modulators.

17. The apparatus of claim 9, further comprising:
    a plurality of downstream cards;
    wherein a first of the plurality of downstream cards comprises the at least one modulator coupled to a first generator;

wherein a second of the plurality of downstream cards comprises a first of the plurality of modulators coupled to a second generator;

wherein a third of the plurality of downstream cards comprises a second of the plurality of modulators coupled to a third generator;

wherein the at least one interface device comprises at least first and second interface cards;

wherein an output of the first generator is coupled to the first and second interface cards;

wherein an output of the second generator is coupled to the first interface card; and wherein an output of the third generator is coupled to the second interface card.

18. An apparatus comprising:
at least one interface configured to receive broadcast content and narrowcast content;
at least one line device configured to
 obtain the broadcast content and narrowcast content from the at least one interface, and
 modulate, by at least one modulator of the at least one line device, the broadcast content and modulate, by a plurality of modulators of the at least one line device, the narrowcast content to produce modulated broadcast content and narrowcast content, wherein the plurality of modulators are separate from the at least one modulator;
at least one interconnect configured to receive the modulated broadcast content and narrowcast content from the at least one line device and route the modulated broadcast content and narrowcast content; and
one or more interface devices configured to receive the modulated broadcast and narrowcast content from the at least one interconnect and to transmit the modulated broadcast and narrowcast content.

19. The apparatus of claim 18, further comprising:
a controller configured to receive an upstream communication from a user device and to direct at least one of the at least one interface, the at least one line device, and the at least one interconnect based at least in part on the upstream communication and a service group associated with the user device.

20. The apparatus of claim 17, wherein each of the first, second, and third generators comprises a radio frequency (RF) generator.

* * * * *

UNITED STATES PATENT AND TRADEMARK OFFICE
CERTIFICATE OF CORRECTION

| | | |
|---|---|---|
| PATENT NO. | : 8,588,198 B2 | Page 1 of 1 |
| APPLICATION NO. | : 12/910932 | |
| DATED | : November 19, 2013 | |
| INVENTOR(S) | : Jorge Salinger | |

It is certified that error appears in the above-identified patent and that said Letters Patent is hereby corrected as shown below:

On the Title Page, Item (57),
Column 2, Abstract, Line 5:
    After "used", please insert --to--

In the Claims,
Column 14, Claim 9, Line 22:
    After "the", delete "processed"

Signed and Sealed this
Ninth Day of June, 2015

Michelle K. Lee
*Director of the United States Patent and Trademark Office*